United States Patent
Ives et al.

(10) Patent No.: US 6,693,796 B2
(45) Date of Patent: Feb. 17, 2004

(54) DISK DRIVE SUPPORT APPARATUS AND METHODS

(75) Inventors: Thom Ives, Boise, ID (US); Jon Anson, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 84 days.

(21) Appl. No.: 09/948,210

(22) Filed: Sep. 8, 2001

(65) Prior Publication Data

US 2003/0048607 A1 Mar. 13, 2003

(51) Int. Cl.$^7$ ................................................ G06F 1/16
(52) U.S. Cl. .................... 361/685; 361/694; 361/695; 361/724; 312/223.1; 312/223.2
(58) Field of Search ................................ 361/685, 689, 361/694–695, 726, 730; 363/141; 454/184; 312/223.1, 223.2

(56) References Cited

U.S. PATENT DOCUMENTS

| | | | | |
|---|---|---|---|---|
| 4,002,955 A | * | 1/1977 | Eggert et al. | 361/726 |
| 5,160,357 A | * | 11/1992 | Faber | 55/385.2 |
| 5,505,533 A | * | 4/1996 | Kammersqard et al. | 312/236 |
| 5,595,270 A | * | 1/1997 | Braun et al. | 188/284 |
| 5,777,845 A | | 7/1998 | Krum et al. | |
| 5,781,408 A | * | 7/1998 | Crane et al. | 361/683 |
| 5,808,866 A | * | 9/1998 | Porter | 361/695 |
| 5,822,184 A | | 10/1998 | Rabinovitz | |
| 6,137,678 A | * | 10/2000 | Gebara et al. | 361/685 |
| 6,330,152 B1 | * | 12/2001 | Vos et al. | 361/688 |
| 6,445,587 B1 | * | 9/2002 | Pavol | 361/727 |

FOREIGN PATENT DOCUMENTS

| | | |
|---|---|---|
| DE | 29905846 U | 6/1999 |
| EP | 0845782 A1 | 6/1998 |
| EP | 0967615 A1 | 12/1999 |
| EP | 1026688 A2 | 8/2000 |
| GB | 2377075 A | 12/2002 |
| WO | WO93/18517 A1 | 9/1993 |
| WO | WO 00/49487 A1 | 8/2000 |

* cited by examiner

*Primary Examiner*—Darren Schuberg
*Assistant Examiner*—Anthony Q. Edwards

(57) ABSTRACT

A disk drive support apparatus to support at least one disk drive. The support apparatus includes a chassis and a suspension system supported on the chassis. At least one disk drive is supported on the suspension system so that the disk drive is substantially isolated from mechanical vibration and shock which can be imparted to the chassis. The invention further includes a method of supporting a disk drive in a disk array system by providing a suspension system to support the disk drive in the disk array system. The suspension system can be foam, mechanical springs, or other suspension systems which provide resilience and dampening of the disk drive to mechanical shock and vibration which can be encountered by the disk array system. The disk drives can be supported in a frame which is itself supported by the suspension system in the chassis.

4 Claims, 3 Drawing Sheets

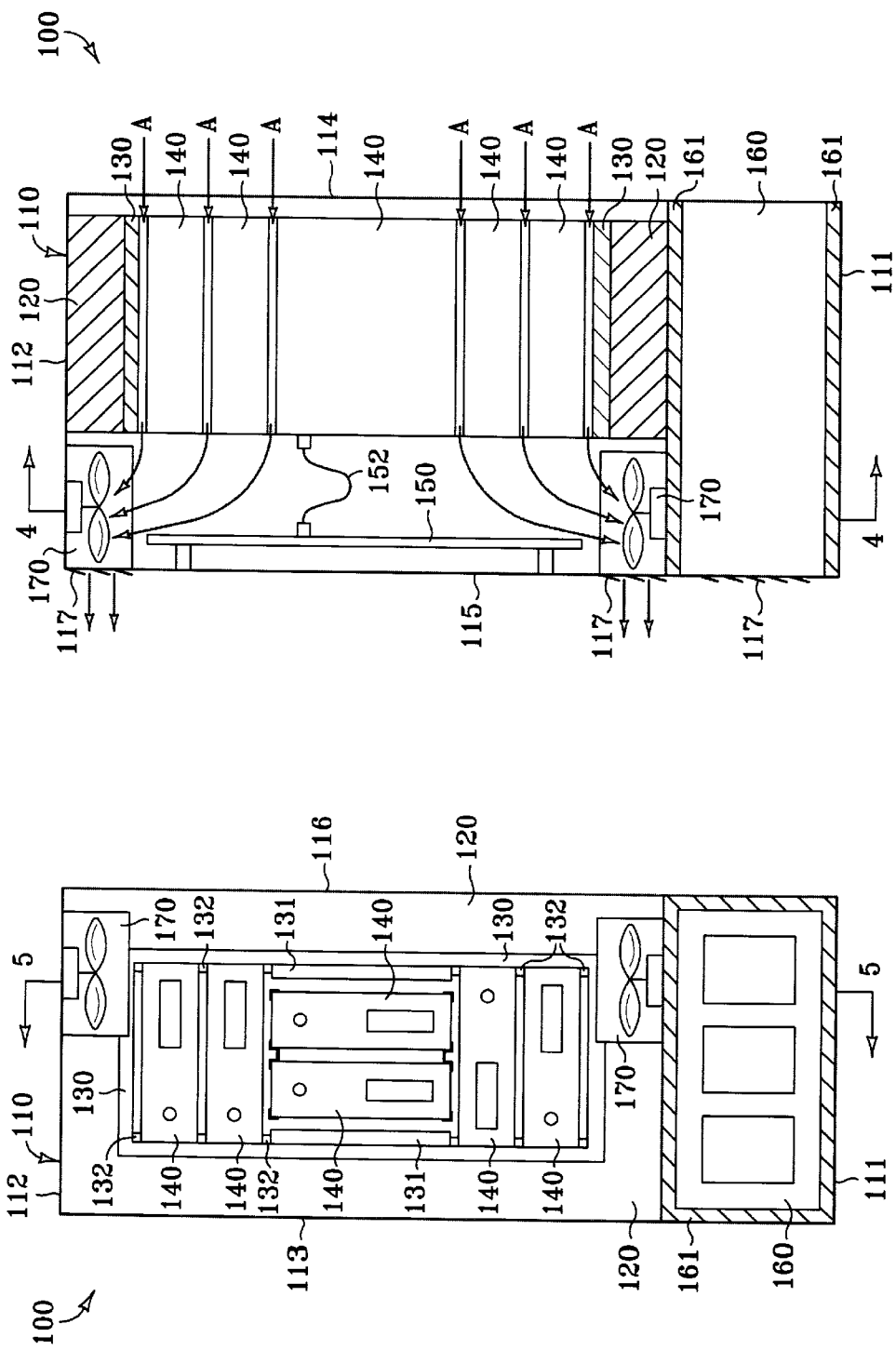

DISK DRIVE SUPPORT APPARATUS AND METHODS

FIELD OF THE INVENTION

The invention claimed and disclosed herein pertains to hard disk drive support apparatus and methods, and more specifically, to hard disk drive support apparatus and methods in which the hard disk drives are suspended.

BACKGROUND OF THE INVENTION

Hard disk drives are known in the art. A hard disk drive is often in the form of a module comprising a hard disk data storage medium along with related components which enable data to be stored and retrieved from the hard disk. Hard disk drives are often arranged in groups that are referred to as "arrays." Hard disk drive arrays generally comprise, in addition to a plurality of hard disk drives, a power supply module, airflow devices for cooling, and a printed circuit assembly (PCA). The power supply module supplies electrical power to the hard disk drives of the array, while the PCA provides signal and power routing between each of the disk drives of the array. The PCA can also act as a controller for the disk drive array by performing various processing functions associated with the operation of the array.

Prior art hard disk drives are generally operationally supported in large cabinet-like enclosures. Each enclosure typically has a door or cover panel on the front through which at least some of the hard disk drives can be accessed for service and the like. Prior art PCA's are usually mounted behind the hard disk drives and toward the back of the enclosure. Each of the hard disk drives is configured to slide into the enclosure in a drawer-like fashion. Respective mating connector portions are mounted on both the PCA and on the back of each of the disk drives. The connector portions are configured to create a connection between each respective disk drive and the PCA when the drive in slid into the enclosure.

Several disadvantages can be associated with the typical configuration of prior art hard disk drive arrays. For example, because of the connector configuration between the PCA and the drives, as explained above, the entire assembly comprising the enclosure and related framework, the hard drives, the connector portions, and the PCA, must adhere to extremely close manufacturing tolerances. That is, extremely close tolerances must be maintained between nearly all of the components of the hard disk drive array assembly so that the connector portions will function properly. This can result in an unacceptably high proportion of resources which are devoted toward achieving such high manufacturing tolerances.

Another disadvantage associated with the typical configuration of prior art hard disk drive arrays is that each of the hard disk drives must typically be removed from the enclosure for shipping of the assembly. That is, each of the hard disk drives must be packed and shipped separately from the enclosure and then reassembled into the enclosure at the shipping destination. This is due to the fact that shock and vibration encountered during shipping can damage the hard drives if they are shipped in the array itself.

Thus, the disk drives are typically packed in shipping containers that are provided with appropriate protective packing materials. The packing materials are generally placed around the disk drives to protect the drives from shock and vibration anticipated during shipping. This also requires that the disk drives be unpacked and installed into an enclosure, or other support device, at the destination. Further, to ensure correct installation and start-up of the disk drives at the end-user site it is often necessary to have a technician from the OEM on-site during such installation and start-up. This can result in delay of the operational availability and readiness of the disk array in cases wherein technicians are in short supply or wherein the technicians must travel great distances. This can all lead to an unacceptable level of resources that must be expended in shipping and setup of the disk arrays.

In addition to avoiding shock and vibration which may damage the hard drives during shipping, it is also desirable to protect the hard drives from shock and vibration while they are operational. For example, an operational disk array system may encounter a shock as a result of an earthquake, or even an operator bumping the disk array system. Likewise, an operational disk array system may encounter vibration resulting from the operation of the disk array system itself, such as from cooling fans, the spinning of disk drives in the array, and the movement of read/write heads within the disk.

Another problem encountered by disk array systems is cooling of the system. Due to the heat generated by operation of the disk drives and the power supply unit, a large amount of heat can build up within a disk drive enclosure. If this heat is not removed, the disk drives may malfunction due to overheating. It is thus desirable to remove the heat in an efficient manner. That is, a disk array cooling system should use as little power as possible to remove as much heat as possible from all of the operational components within the disk array system, and from the disk drives in particular.

What is needed then is a disk drive support and a disk array system that achieves the benefits to be derived from similar prior art methods and devices, but which avoids the shortcomings and detriments individually associated therewith.

SUMMARY OF THE INVENTION

The instant invention generally concerns apparatus and methods of supporting at least one disk drive in a manner that minimizes mechanical shock and vibration to the disk drive. In one embodiment, the disk drive is supported on a suspension system that acts to absorb external forces. A chassis is provided on which the suspension system is supported. The chassis can be in the form of an enclosure to protect the disk drive, as well as related components, from environmental elements. The disk drive can be supported directly on the suspension system or, in the alternative, can be supported on a frame that is directly supported on the suspension system. The disk drive can be rigidly mounted on the frame so that the frame and the disk drive together act as a unitary mass relative to the suspension system. That is, the additional mass of the frame can serve to lessen the mechanical shock and vibration experienced by the disk drive because of the additional inertia of the frame and disk drive together.

The chassis provides single-faced access to the internal components thereof, including the disk drives. This allows similar chassis to be located adjacent to one another in back-to-back, stacked and sided-to-side configurations while not affecting internal access to any given chassis. Connections with other arrays can be made from the front to also assist in this flexible configurability. The suspension system can comprise a layer of foam. The foam can act both as a resilient support as well as a damping device, thereby facilitating relatively efficient and simple construction of the suspension system and other support components such as the chassis and frame, while at the same time affording desirable shock and vibration protection for the disk drive.

These and other aspects and embodiments of the present invention will now be described in detail with reference to the accompanying drawings, wherein:

DESCRIPTION OF THE DRAWINGS

FIG. 4 depicts a front schematic diagram of the apparatus which is depicted in FIGS. 1 through 3, with the door panel and the printed circuit assembly omitted.

FIG. 5 depicts a side schematic diagram of the apparatus which is depicted in FIGS. 1 through 4.

DETAILED DESCRIPTION OF THE INVENTION

The present invention provides methods and apparatus to reduce the effects of external mechanical shock on disk drives of a disk array system. In the present invention, at least one disk drive is supported on a suspension system which, in turn, is supported on a chassis. The suspension system functions to absorb physical forces in the form of shock and vibration that are applied to the chassis. The absorption of such forces by the suspension system can serve to isolate the disk drives from undesirable acceleration and movement so as to reduce malfunctioning and premature wear of the disk drives.

In the following discussion, we refer to "disk array systems." By this expression, we mean an apparatus which supports a plurality of disk drive devices and which can also include other collateral devices used to operationally support the disk drives, such as a power supply, a cooling fan and a controller. Furthermore, although the invention will be described below with respect to a particular configuration of a disk array system, it is understood that the invention can apply to any system in which one or more disk drives are supported in a chassis or an enclosure which is intended to either be placed in an operational environment or mounted on or within another supporting structure or device. Moreover, we also refer to a "disk drive", or "plurality of disk drives." By this expression, we mean any apparatus which can be used to store data, including magnetic memory devices such as hard disks and floppy disks, as well as optical memory devices, such as compact disks or DVD's.

Figure 1:
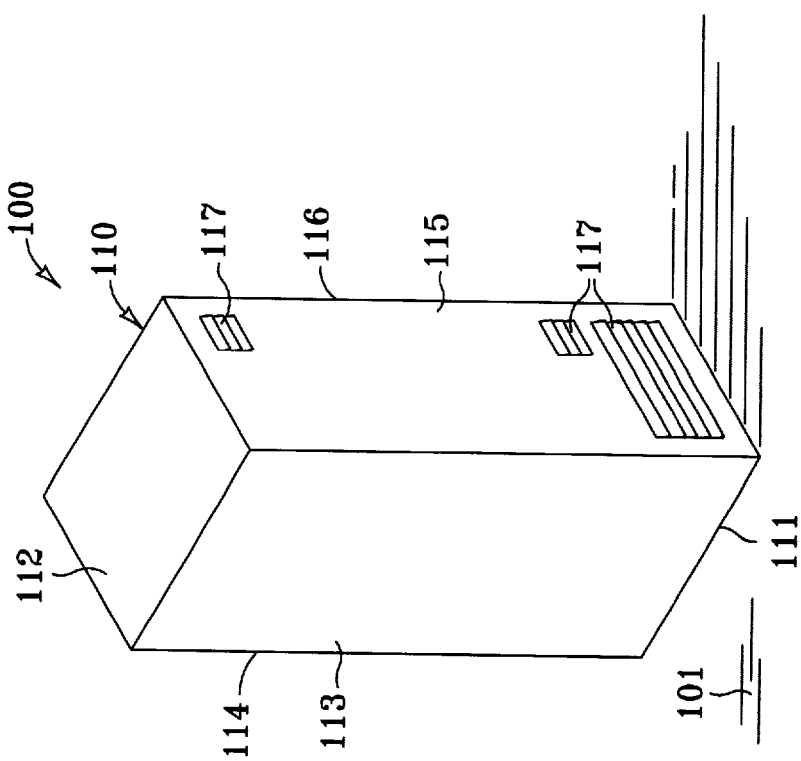
FIG. 1 depicts a front isometric view of a disk array system in accordance with one embodiment of the present invention.

Turning to FIG. 1, a front isometric view is depicted of a disk array 100 in accordance with one embodiment of the present invention. The disk array system includes a disk array support apparatus, which comprises those components used to support the disk drives in the overall disk array system 100, as will be described further below. The disk array system 100 comprises a chassis 110. One primary function of the chassis 110 is to provide at least a minimum of structural support to various internal components which are not shown in FIG. 1, but which are described below and shown in accompanying figures. The chassis 110 is preferably enclosed as depicted so as to provide protection to the various internal components against various environmental elements such as dust, dirt, and the like.

Thus, when we refer to the chassis 110 as "enclosed" or as an "enclosure" we mean that the chassis is generally configured as depicted in the accompanying figures, wherein the chassis forms a substantially closed outer protective shell or the like. When we say that a given object is "within the chassis" we mean that the object is within the protective shell provided by the chassis in the case wherein the chassis is enclosed. It is understood that such a protective shell can comprise components that are separate from any structural components (not shown) of the chassis 110. In the alternative, the protective shell can be integral with the chassis 110.

The chassis 110 can be configured to rest on a floor 101 or the like, although it is understood that the chassis can alternatively be configured to be supported on a larger structure (not shown), such as a rack or the like. Furthermore, it is understood that several chassis 110 can be stacked, one on top of the other. Likewise, several chassis 110 can be arranged adjacent to one another in a side-by-side fashion, and/or back-to-back. This is facilitated by the "single-face" access scheme of the chassis 110 which is explained in greater detail in later discussion.

As is seen, the chassis 110 preferably has a top 112 and an opposite bottom 111, as well as a first side 113 and an opposite second side 116. Additionally, the chassis 110 preferably comprises a front 115 that is more preferably in the form of a door panel or the like, as shown. Preferably, the door panel 115 defines therein at least one vent opening 117 which is configured for the passage of air there through as will be more thoroughly explained below. The door panel 115 can be mounted on the chassis 110 by way of hinges (not shown) or the like so as to allow the chassis to be opened via the door panel. Alternatively, the door panel 115 can be completely removable from the chassis 110.

Preferably, the door panel 115 is provided with a fastening mechanism (not shown), such as a locking device or the like, which is configured to secure the door panel to the chassis 110 in a closed position as shown. Additionally, the door panel 115 is preferably configured to be sealed against the remainder of the chassis 110 in a substantially air-tight manner by way of any of a number of known sealing means such as by way of gaskets or the like. Such sealing of the door panel 115 can promote more efficient air flow through the chassis 110.

Figure 2:
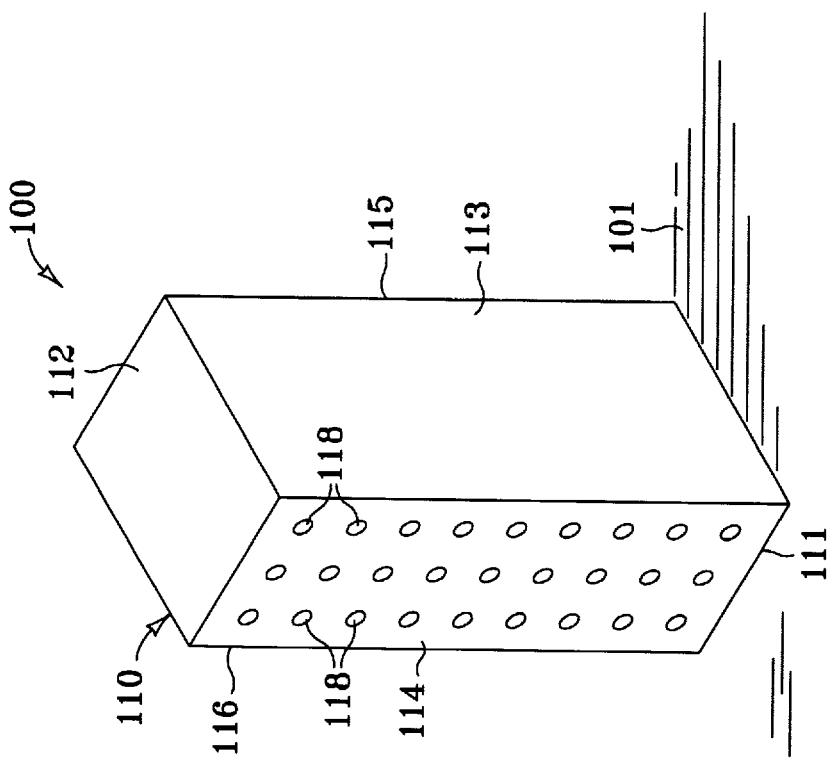
FIG. 2 depicts a rear isometric view of the apparatus which is depicted in FIG. 1.

Moving now to FIG. 2, a rear isometric view is shown of the disk array system 100. As is evident, the back 114 of the chassis 110 is visible while the front 115 is obstructed from view. As is further evident, the back 114 preferably defines therein at least one air inlet opening 118 for the passage of air there through, and more preferably defines a plurality of such openings. Thus, as is seen from FIGS. 1 and 2, the chassis 110 is preferably enclosed in the manner of a cabinet or the like which has a removable, or openable, door panel 115 which forms the front of the chassis. The door panel 115, as well as the back 114, preferably define respective openings 117, 118 which are configured to allow the passage of air there through. As explained above, the chassis 110, which can be enclosed, is configured to provide at least a minimum of structural support for various internal components which shall now be described.

Figure 3:
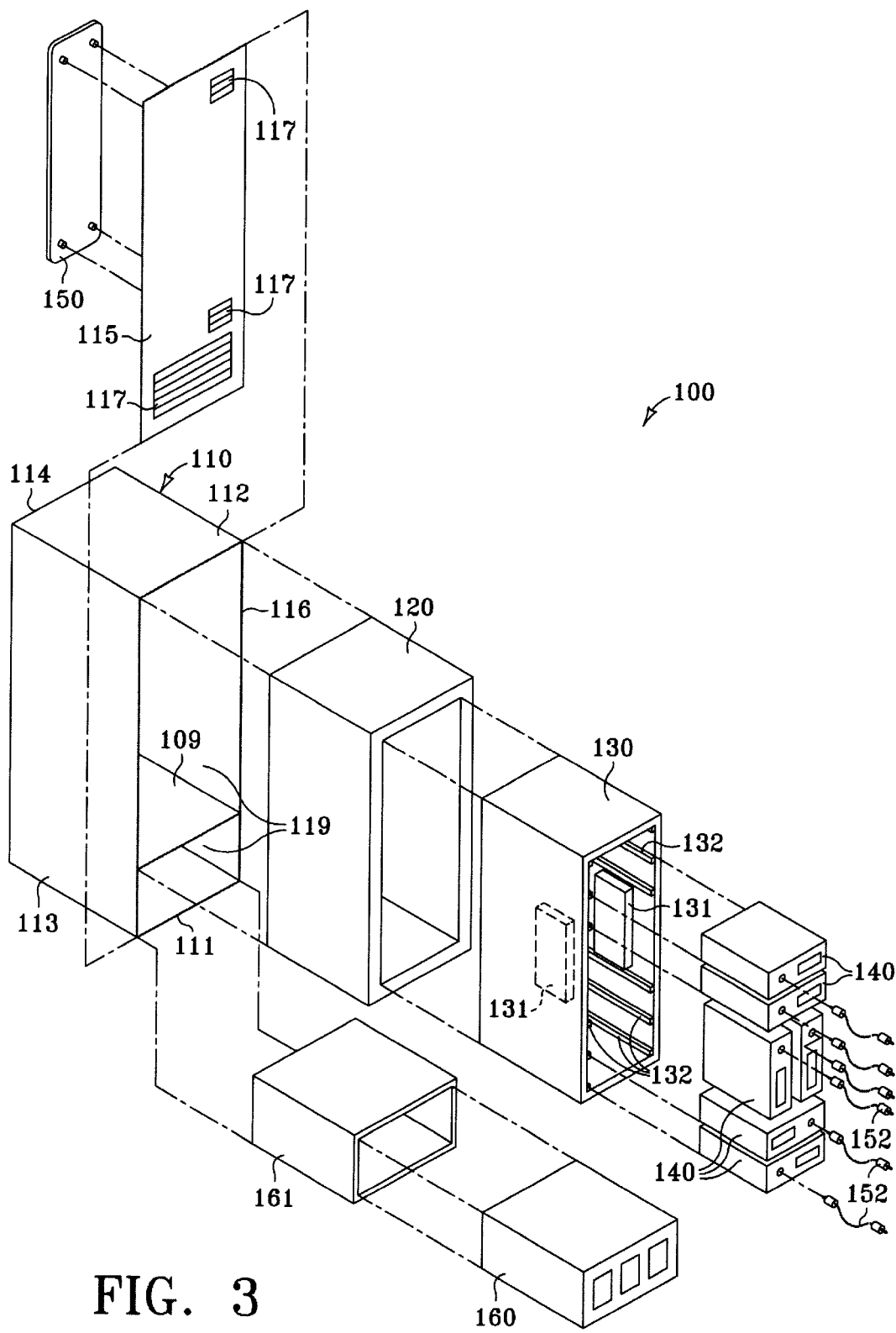
FIG. 3 depicts a front isometric exploded view of the apparatus which is depicted in FIGS. 1 and 2.

Turning to FIG. 3, a front isometric exploded view is shown of the disk array system 100 of FIGS. 1 and 2. As is seen, the door panel 115 is shown removed from the chassis 110 so as to reveal the interior thereof. The chassis 110 is preferably enclosed as mentioned above, and the interior of the chassis can be divided into two compartments, or portions, by a divider panel 109 as shown. As further disclosed by FIG. 3, the chassis 110 can define an access opening 119 through which various components can be accessed. As is evident, the door panel 115 is configured to cover the access opening 119.

A close examination of FIG. 3 reveals that the access opening 119 is a single-face access opening. When we say "single-face access opening" we mean that all of the internal components (which are described below) of the chassis 110 can be accessed through a single side, or face, of the chassis. Furthermore, any connection to other arrays, servers, etc., can be made available at this single face as discussed in greater detail below. Thus, the chassis 110 can be surrounded on the top 112, bottom 111, sides 113 and 116, and the back 114, by like chassis (or other objects) while still providing convenient access to the internal components of each respective chassis.

This single-face access feature can facilitate the ease of expansion of any given disk drive array system by the incremental addition of like chassis 110 adjacent to one another. That is, a disk drive array system can be expanded by adding several chassis 110 next to one another in side-by-side manner, as well as in a stacked, one-on-top-of-another manner. Moreover, two chassis 110 can be placed back-to-back as long as provisions are made for the entrance of cooling air at the back 114, as will be discussed below. Each additional chassis 110 can be conveniently fastened directly to those adjacent to it in order to provide additional structural support for the overall system of multiple chassis. Alternatively, the multiple chassis 110 of a group can be supported on a rack or the like (not shown) which is configured to support several chassis in a closely packed manner.

It is understood that in cases wherein several chassis 110 are assembled together in a group as described above, connections for power and/or signal transmission and the like between each of the respective chassis can be accomplished by any of a number of means including metallic conductors, fiber optic filaments, or any of a number of various wireless means including infrared beam, radio wave, or sound wave. It is further understood that provisions for linking adjacent chassis 110 to one another for such power and/or signal transmission can be accomplished in any of a number of manners including the mounting of self-aligning connector ports (not shown) or the like on the top 112, sides 113, 116, bottom 111, and back 114 of each chassis, wherein the ports of two adjacent chassis can be linked during placement of the respective chassis. Preferably, however, cable (including fiber optic filament and metallic conductor) connections between a given chassis 110 and any other device (including another chassis) are made by way of connection points (not shown) which can be located on the front 115 side of the chassis.

In addition to the chassis 110, the apparatus 100 also comprises a suspension system 120. The suspension system 120 is configured to be supported on the chassis 110 and is preferably configured to be supported within the chassis as indicated in FIG. 3. The suspension system 120 preferably comprises a layer of foam or the like as shown. More preferably, the suspension system 120 comprises dry, cured, resilient foam such as polyurethane foam, or the like. The suspension system 120 will be discussed in greater detail below.

As further revealed by FIG. 3, the apparatus 100 preferably comprises a frame 130. The frame 130 is configured to be resiliently supported on the suspension system 120. In the case wherein the suspension system 120 comprises a layer of foam, as shown, the frame 130 is preferably configured to be nested within the foam so that the foam separates the chassis 110 and the frame 130. The frame 130 preferably forms as substantially rigid structure, and is more preferably fabricated from a relatively dense structural material such as steel or the like. The frame 130 can include at least one weight 131 which is rigidly mounted thereon, and a system of mounting rails 132 which shall be described below.

The apparatus 100 can comprise at least one disk drive 140, and preferably comprises a plurality of disk drives as shown. The disk drives 140 are preferably configured to be rigidly mounted on the frame 130. When I say "rigidly mounted" I mean mounted so that relative movement between the respective objects is substantially prevented, wherein such mounting results in the respective objects reacting to external and internal forces as a substantially integral unitary mass. The disk drives 140 can be rigidly mounted on the frame 130 by any of a number of mounting methods and devices including the use of fasteners, clamps and the like. Additionally, the mounting rails 132 can be utilized in mounting the disk drives 140 on the frame 130. As shown, each of the disk drives 140 is preferably spaced apart from one another to facilitate the flow of air there between.

It is understood that the frame 130, as well as the weight 131 and the mounting rails 132, can be omitted from the apparatus 100 in the alternative. That is, alternatively, the disk drives 140 can be rigidly mounted to one another wherein the disk drives are supported directly by the suspension system 120. Thus, in accordance with the present invention, at least one disk drive 140 is supported on the chassis 110 by way of the suspension system 120 whether or not a frame 130 is included in the apparatus 100.

In the case wherein a plurality of disk drives 140 are to be supported on the suspension system 120, the disk drives are preferably formed into a substantially rigid array, or group, wherein the disk drives which make up the array are substantially immobilized relative to one another whether or not the frame 130 is employed for such purposes. Thus, the frame 130 can be omitted from the apparatus 100 in the alternative, wherein the disk drives 140 are rigidly mounted to one another by way of any of a number of possible means including the use of fasteners, clamps, braces, straps and the like. In any case, each of the disk drives 140 are preferably spaced apart from one another as described above when supported on the chassis 110 via the suspension system 120. Also, it is understood that one primary function of the suspension system 120, whether or not the frame 130 is to be employed, is to absorb mechanical shock and vibration so as to substantially isolate and protect the disk drive(s) 140 there from.

A close examination of FIG. 3 reveals that the disk drives 140 can be supported by the suspension system 120 in any of a number of possible orientations relative to one another. That is, in the case wherein a plurality of disk drives 140 are supported on the suspension system 120, each of the disk drives can be oriented in a substantially parallel and substantially identically oriented manner relative to one another as indicated by the two upper-most disk drives. Also, at least one of the disk drives 140 can be oriented substantially perpendicularly (or at a right angle) relative to another of the disk drives as indicated by the uppermost four disk drives. Further, at least one of the disk drives 140 can be oriented substantially upside down (or opposite) relative to another of the hard disk drives as indicated by the two lower-most disk drives.

The use of one or more of such various orientations of the disk drives 140 relative to one another has been found to be advantageous in minimizing self-induced vibration when the disk drives are rigidly mounted to one another, or when rigidly mounted on the frame 130. It is understood that the various orientations of the disk drives 140 relative to one another which are described herein and shown in the accompanying figures are intended to illustrate but a few of the many possible orientations. Thus, it is understood that the descriptions of the orientations herein are not intended to limit the possible relative orientations in accordance with the instant invention to those specifically shown and described.

It is understood that the suspension system 120 can comprise any resilient material or device that is capable of facilitating the operation and intended function of the suspension system. As indicated above, the intended purpose of the suspension system 120 is to substantially isolate the disk drive(s) 140 from mechanical vibration and/or shock that is applied to and/or experienced by the chassis 110. In other words, when we say "suspension system" we mean a system that is mounted between the chassis 110 and the disk drive(s) such that at least some resilient and dampened movement of the disk drive(s) relative to the chassis is provided by the suspension system, and wherein a purpose of such movement is to provide to the disk drive(s) at least some isolation from mechanical vibration and shock which is experienced by the chassis.

As mentioned above, the suspension system 120 preferably comprises a layer of resilient, compliant foam which is configured to be nested within the chassis 110 as shown. The suspension system 120 can also comprise "molded foam" by which we mean a foam system which is formed or shaped so as to fit to the frame 130 and/or chassis 110. For example, the foam can be made into the desired shape during the process by which the foam is manufactured. The foam system can also be built-up from a number of individual foam pieces. Further, the foam system can be carved or shaped from one or more monolithic pieces of foam into the desired shape.

However, it is understood that, in the alternative to, or in addition to, comprising foam, the suspension system 120 can comprise any of a number of other materials and/or devices (not shown) which are configured to facilitate the operation and intended function of the suspension system, including mechanical springs, air springs, padding, shock absorbers, and the like. Preferably, the suspension system 120 provides resiliency (OK) as well as damping qualities. It has been found that foam is a desirable material for use in the suspension system 120 because it provides both resiliency and damping qualities as well as other advantages including light weight, simplicity of design, and air sealing properties. Further, foam can be pre-compressed before being inserted into the chassis 110 to provide additional mechanical impedance. In other words, pre-compression of the foam can be easily compress before installation so as to increase the effective "spring rate" of the foam relative to its function as a resilient member of the suspension system 120.

A printed circuit assembly 150 can also be included in the apparatus 100. Printed circuit assemblies have been explained above with respect to the prior art. It is understood, however, that the printed circuit assembly 150 is meant to include any device which is configured to provide routing of signals and/or power to or between any disk drive(s) 140. The printed circuit assembly 150 can be placed in a supported position on the chassis 110, the frame 130, the door panel 115, or any other suitable supporting object. Thus, it is understood that any of number of objects can be employed to support the printed circuit assembly 150, and that other configurations and supported positions, which are not shown or described herein, can be utilized in accordance with the instant invention.

The apparatus 100 can include a plurality of connectors 152 which are configured to connect each of the respective disk drives 140 to the printed circuit assembly 150. Preferably, the connectors 152 are flexible in the manner of flexible cable connectors or the like which enable each of the disk drives 140 to be connected to the printed circuit assembly 150 before the printed circuit assembly is placed in its supported position. Additionally, a flexible type of connector 152 can be advantageous in allowing movement of the disk drives 140 relative to the printed circuit assembly 150. Such movement can facilitate the operation of the suspension system 120 in cases wherein the printed circuit assembly 150 is supported on objects such as the door panel 115 or chassis 110.

The apparatus 100 preferably includes a power supply module 160 which is configured by known means to supply power to the various components of the apparatus including, for example, the disk drives 140 and the printed circuit assembly 150. The power supply module 160 is preferably supported on the chassis 110 by way of a layer of foam 161 or the like which separates the chassis and the power supply module. It is understood that other materials or devices can be employed in place of the foam 161. For example, the power supply module 160 can be mounted to the chassis 110 by way of rubber isolators (not shown) or the like. As yet a further alternative, the power supply module 160 can be mounted directly on the chassis 110.

As a study of FIG. 3 reveals, the door panel 115 of the apparatus 100 can be preferably secured to the chassis 110 when the above-described components, including the suspension system 120, frame 130, disk drives 140, printed circuit assembly 150, and power supply module 160, have been placed into their respective positions on the chassis as indicated. A description of various operational aspects of the disk array system 100, as well as a description of additional items and features thereof which have not been heretofore described, will now follow.

With reference now to both FIGS. 4 and 5, a front schematic diagram and a side schematic diagram, respectively, of the disk array system 100 of FIG. 3 are shown. Although the door panel 115 as well as the printed circuit assembly 150 are shown in FIG. 5, they have been omitted from FIG. 4 for clarity. Also in the interest of clarity, only one of the connectors 152 has been shown. As seen, and as described above, the suspension system 120 is supported on the chassis 110. As is seen in both FIGS. 4 and 5, the frame 130, which is preferably included in the apparatus 100, is shown supported on the suspension system 120.

As previously described, the disk array system 100 comprises at least one disk drive 140 which is preferably rigidly mounted on the frame 130. Alternatively, however, a plurality of disk drives 140 is rigidly mounted on the frame 130. The frame 130 can be omitted from the apparatus 100, in which case the hard disk drives 140 are rigidly mounted to one another. In either case, as explained above and as shown, the disk drive(s) 140 are preferably spaced apart from one another to permit air to flow there between.

In the case wherein the suspension system 120 comprises a layer of foam, the foam preferably surrounds the frame 130 and/or the disk drives 140 as depicted. Although not a requirement, the foam of the suspension system 120 preferably completely fills the void between the chassis 110 and the frame 130 and/or disk drive(s) 140. Thus, the suspension system 120 preferably acts to substantially prevent any airflow between the chassis 110 and the frame 130 and/or disk drive(s) 140 while also acting to suspend the frame 130 and/or the disk drives 140 on the chassis 110.

As mentioned above, the disk array system 100 can comprise at least one weight 131 which is preferably rigidly mounted on the frame 130. The mass of the weight 131 is preferably adjustable. The adjustable nature of the weight 131 can be provided for by any of a number of manners. For example, the weight 131 can comprise several smaller portions (not shown), wherein the smaller portions can be removed or added so as to remove or add mass to the weight.

Alternatively, the weight 131 can contain therein a material (not shown) which can be easily removed or added such as a liquid or a granular substance. In this manner, the inertial mass of the unit comprising the frame 130 and disk drives 140 can be adjusted by changing the mass of the weight 131. The adjustable nature of the weight 131 can facilitate "fine tuning" the characteristics of the suspension system 120 in light of the inertial mass of the disk drive(s) 140, the frame 130, and the "effective spring rate" of the suspension system 120. One object of such fine-tuning of the suspension system 120 is the minimization of unnecessary movement and/or vibration of the disk drives 140 in response to external mechanical shock and the like experienced by the chassis 110.

The optimal mass of the weight 131 can be determined by first subjecting the disk array system 100 to various inputs of shock and vibration which the system is likely to encounter in operation. While subjecting the disk array system 100 to such inputs, the resulting response of the disk drives 140 is measured using an accelerometer or the like. Mass can be added to or subtracted from the weight 131 until a desired or an acceptable response of the disk drive 140 to the shock and vibration inputs is achieved. The aforementioned process can be reduced or eliminated by alternatively employing predictive modeling techniques that are well known in the art.

In the case wherein the suspension system 120 comprises a layer of foam, as shown in the accompanying figures, the suspension system can be tuned by employing one or more various foams of differing properties. For example, foam having certain resiliency as well as certain damping qualities can be chosen in response to given parameters such as the mass of the disk drives 140 and the like. Additionally, as mentioned above, the foam can be pre-loaded or compressed before it is placed into the void between the chassis 110 and the frame 130 and/or the disk drive(s) 140.

Further examination of the accompanying figures reveals that the disk drive system 100 preferably includes at least one cooling unit 170 which can comprise a fan or blower or the like. One specific example of such a cooling unit is a rotary "squirrel cage" fan. The cooling unit 170 is preferably located between the disk drives 140 and the door panel 115 as shown, although other locations of the cooling unit are possible and can be similarly effective. The cooling unit 170 can be configured to induce a stream of air "A" to flow between the disk drives 140 as depicted. The stream of air "A" which flows between the disk drives 140 can facilitate cooling of the drives by absorbing and carrying off excess heat energy which builds up in the drives during operation thereof. At least a portion of the stream of air "A" is preferably directed across the printed circuit assembly 150 by the cooling unit 170 as shown to facilitate cooling of the printed circuit assembly.

In one preferred embodiment of the instant invention which is depicted in the accompanying figures, the stream of air "A" can be caused to enter the chassis 110 by way of the inlet openings 118 which are defined in the back 114. Upon entering the chassis 110, the stream of air "A" can then be caused to flow between the disk drives 140 as shown. The stream of air "A," having absorbed heat from the disk drive(s) 140 and/or the printed circuit assembly 150, can then enter the cooling unit 170, which is preferably in the form of a fan or blower, whereupon the air is expelled from the chassis 110 through one of the vent openings 117 (shown in FIGS. 1 and 3). Each of the vent openings 117 are preferably operably aligned with a respective cooling unit 170. Preferably, the vent openings 117 through which the air "A" is expelled, are configured to direct the stream of air in an upwardly direction such as by way of the employment of louvers or the like. This can promote the natural movement of relatively buoyant warm air "A" in an upwardly direction.

It is understood that in other embodiments of the instant invention which are not shown, the air stream "A" can be caused to flow in a substantially opposite direction than that described above and depicted in the accompanying figures. That is, the stream of air "A" can alternatively be caused to flow into the chassis 110 through one or more vent openings 117, for example, before being caused to flow between the disk drives 140 and then out of the chassis by way of the openings 118 in the back 114. Thus, in an alternative embodiment of the present invention, the direction of flow of the stream of air "A" can be substantially reversed from that shown with similar effect relative to the cooling of the disk drives 140 and/or other internal components.

Furthermore, it is noted that the location of the cooling unit 170 is not intended to be limited to that which is described herein with respect to the accompanying figures. Contrarily, the location shown and described is intended to illustrate but one of a number of possible locations of the cooling unit 170 which can be employed with similar effect. That is, the location of the cooling unit 170 can be altered from that which is shown and described herein in accordance with a number of factors such as the type of cooling unit utilized, and the like. For example, the cooling unit 170 can alternatively be placed, with similar effect, between the back 114 and the disk drives 140 rather than in the location shown and described herein. Moreover, the chassis 110 can be connected, by way of an external duct or the like (not shown) to a central external air handling system (not shown) which is configured to induce the stream of air "A" to flow through one or more of the chassis 110.

It is also noted that, in the case wherein multiple chassis 110 are assembled together in a group of chassis as described herein, each of the chassis are preferably configured such that the flow of the stream of air "A" is in the same direction relative to each respective chassis. For example, all the chassis 110 in a group of assembled chassis are preferably configured so that the flow of the stream of air "A" is from front to back. Alternatively, all the chassis 110 in a group of assembled chassis are preferably configured so that the flow of the stream of air "A" is from back to front. In this manner, the induction by one chassis 110 of warmed air which has been expelled from another chassis is avoided.

Furthermore, it is preferred that the general environmental area (such as a computer room or the like) in which the chassis 110 are located is configured so that relatively cool air is introduced therein from below while warmed air is drawn away from above. In this manner, efficient movement of the cooling air can be maintained within the environmental area by complimenting the natural upwardly movement of air as it is warmed.

As mentioned above, blockage of the openings 118 (shown in FIG. 2) which are defined in the back 114 of the chassis 110 is preferably prevented in placement of the chassis 110. That is, when placing two similar chassis 110 in a back-to-back orientation, or when placing a chassis against any object wherein the object is adjacent to the back 114, a space is preferably maintained so as to create an offset between the back and any other object. This can be beneficial in allowing adequate cooling air "A" to enter, or exit, the openings 118 for cooling of the internal components. In the alternative, a shroud (not shown) or the like, can be supported on the back 114 in an off-set, parallel, juxtaposed relation thereto, for example, so as to define an air plenum chamber (not shown) adjacent to the back. Such a shroud can thus prevent inadvertent blockage of the air openings 118. Furthermore, such shrouds can provide mutual attachment points for respective chassis 110 which are placed in a back-to-back orientation.

As evident from FIGS. 4 and 5, the printed circuit assembly 150 can be mounted on the door panel 115 so as to be automatically placed in its supported position when the door panel is secured to the chassis 110 as shown. The connector 152 can be employed to provide a signal and/or power connection between the respective disk drive(s) 140 and the printed circuit assembly 150. As explained above, the connector 152 is preferably flexible so that the connector can be installed before the printed circuit assembly 150 is placed into its supported position. As also seen, the power supply module 160 can be included in the apparatus 100 and can be supported on the chassis 110 by way of the layer of foam 161 or the like. It is understood that a plurality of connectors 152 can be included in the disk array system 100 as required for connecting various internal components, including the disk drives 140, the power supply module 160, and the printed circuit assembly 150 among others.

In accordance with another embodiment of the present invention, a method of supporting a disk drive comprises assembling a plurality of disk drives into a substantially rigid array. In the disk array, the disk drives are rigidly mounted so as to be substantially immobilized relative to one another. We have described above how this can be accomplished. The method also comprises suspending the array of disk drives. For example, the disk drive array can be suspended on a chassis or the like in the manner described about and shown in the exemplary design of FIGS. 1–5.

The array of disk drives can be formed by rigidly mounting the hard disk drives to one another. Alternatively, the array can be formed by rigidly mounting the disk drives on a frame or the like, such as the frame 130 of FIG. 3 which is described above. If the array of disk drives is formed by mounting the disk drives on a frame, the mass of the frame can be altered so as to affect the movement of the disk drives while suspended in the manner described above with respect to the weight 131 of FIG. 3.

The method can include isolating the disk drives from mechanical shock and vibration, such as by any of the means described herein above. Thus, the array of disk drives 140 can be shipped pre-mounted in a support such as within the chassis 110 which is described above and shown in the accompanying figures. That is, the disk drives can be shipped while installed in a chassis or the like with reduced risk of damage to the disk drives. Further, such a method of protecting the disk drives from shock and vibration while they are mounted in the chassis reduces the opportunity for the disk drives to be affected by mechanical shock and vibration while they are in operation.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A disk array system comprising:
    a chassis;
    a resilient foam supported on the chassis;
    a frame resiliently supported on the resilient foam;
    a plurality of disk drives supported on the frame;
    a door panel; and,
    a printed circuit assembly, wherein:
        the chassis defines an access opening and the door panel is configured to cover the access opening; and,
        the printed circuit assembly is configured to be supported between the disk drives and the door panel, and in parallel, juxtaposed relation to the door panel.

2. A disk array system comprising:
    a chassis;
    a resilient foam supported on the chassis;
    a frame resiliently supported on the resilient foam;
    a plurality of disk drives supported on the frame; and
    a weight that is attached to the frame.

3. The disk array system of claim 2, and wherein:
    the weight has mass; and,
    the mass of the weight is adjustable in facilitation of fine tuning thereof.

4. A disk array system, comprising:
    a substantially enclosed chassis that is configured to support therein a plurality of disk drives, wherein an access opening is defined through the substantially enclosed chassis;
    a door panel that is configured to cover the access opening; and,
    a printed circuit assembly that is configured to be supported between the disk drives and the door panel, and in parallel, juxtaposed relation to the door panel.

* * * * *